UNITED STATES PATENT OFFICE.

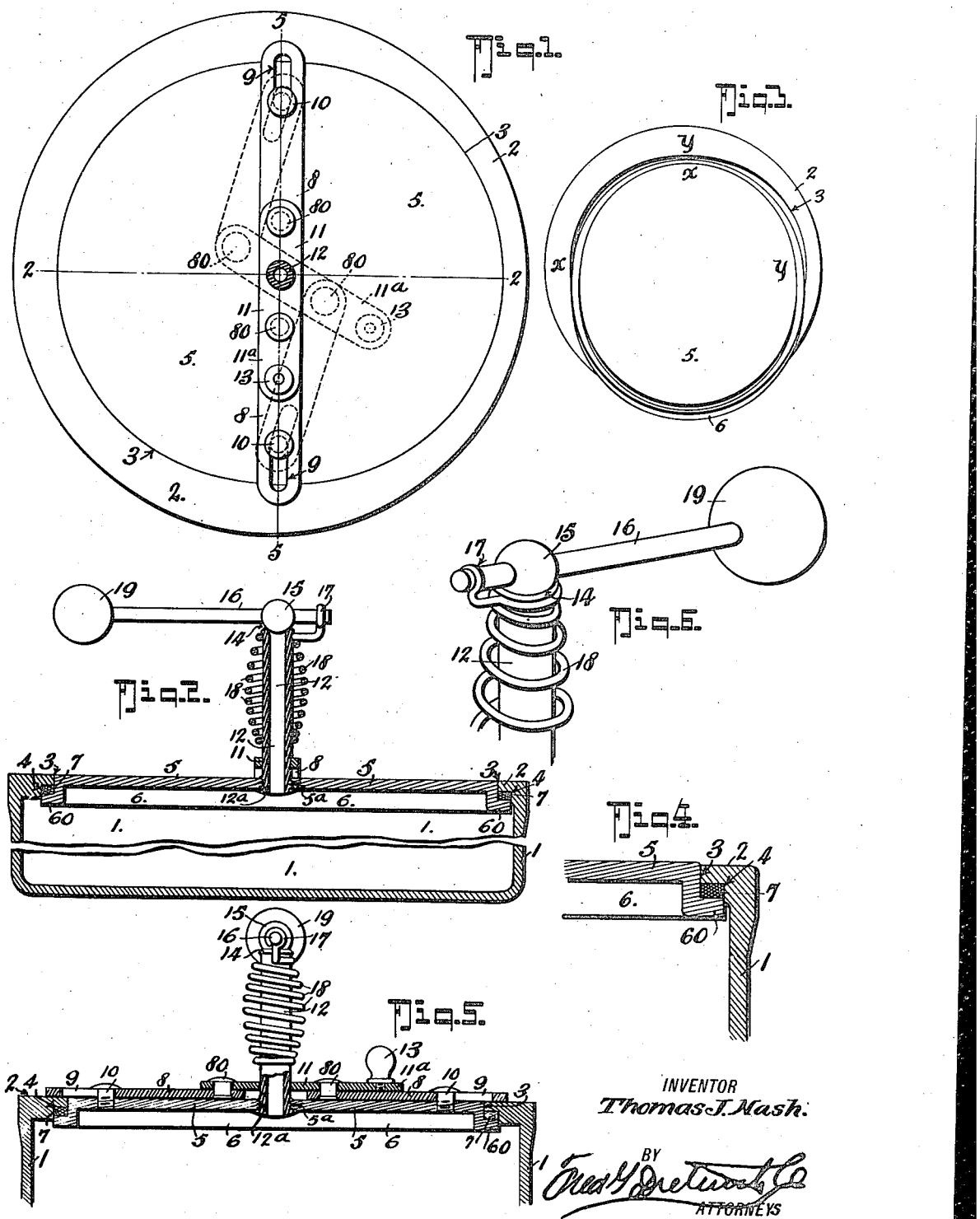

THOMAS J. NASH, OF LINCOLN, NEBRASKA, ASSIGNOR TO NASH MANUFACTURING COMPANY, OF LINCOLN, NEBRASKA.

HIGH-PRESSURE STEAM-COOKER.

1,204,055.      Specification of Letters Patent.      Patented Nov. 7, 1916.

Application filed November 9, 1915. Serial No. 60,591.

*To all whom it may concern:*

Be it known that I, THOMAS J. NASH, residing at Lincoln, in the county of Lancaster and State of Nebraska, have invented certain new and useful Improvements in High-Pressure Steam-Cookers, of which the following is a specification.

My present invention, which generally has for its purpose to provide an improved high pressure steam cooking utensil, more particularly has reference to an improved form of a cover or closure member that constitutes the top of the utensil, and which is of a simple, economical and effective nature, that can be quickly applied for use and held sealed, whereby to render the utensil odor and fluid tight and provide for quickly cooking the food and retain its odor, flavor and nutriment.

Another object of my invention is to provide, in a cooking utensil of the character stated, an improved cover and means mounted thereon for holding it in its closure position, and coöperatively so arranged that the cover may be quickly applied upon the utensil and held to its operative position.

Again, my present invention has for its purpose to provide, in a high pressure cooking utensil, an improved manner of mounting the sealing gasket that forms the steam tight joint between the cover and the utensil top to thereby materially increase the life and effectiveness of the said sealing or packing member.

Furthermore, my invention comprehends, in a cooking utensil, an improved construction of cover having a tubular handle that also serves as a vent for the utensil, a relief valve device mounted thereon at a point above the hand gripping portion thereof whereby to avoid danger of burning the hand while shifting the cover to the closure and releasing positions, and an improved means mounted upon and removable with the cover and coöperatively connected with the tubular handle for holding the said cover to its closed position.

With other objects in view, my invention, in its more subordinate natures, consists in the peculiar combination and novel arrangement of the parts hereinafter fully described, specifically pointed out in the appended claims and illustrated in the accompanying drawing, in which:

Figure 1 is a plan view of my improved high pressure cooking utensil, the cover being shown held in the closure position, the toggle lever members mounted thereon being shown at the released or inoperative position, in dotted lines. Fig. 2 is a vertical cross section thereof on the line 2—2 of Fig. 1. Fig. 3 is a diagrammatic plan view that illustrates the relative position of the elliptical cover and the elliptical opening in the utensil top, when applying the cover to the said top. Fig. 4 is a detail section of a portion of the utensil top, and the cover, and illustrates the manner in which the sealing gasket is held from direct contact with the vapors within the utensil. Fig. 5 is a transverse section of the utensil top, the cover and the toggle lever devices taken on the line 5—5, on Fig. 1. Fig. 6 is a detail perspective view of the relief valve pivotal connection on the tubular handle.

In carrying out my present invention, the body 1 of the cooker, which may be of any suitable size and shape, includes a flat top 2 having an elliptical opening 3; the rim edge of which is undercut to form an annular groove or seat 4, the purpose of which will presently appear.

5 designates a cover, in the nature of a flat body having an elliptical shape corresponding to the opening 3 in the top 2, and into which it snugly fits when adjusted to the closure position, with the upper face thereof flush with the upper face of the top 3, as is clearly shown in Figs. 2 and 5 of the drawings.

The elliptical shaped cover 5 has an annular dropped flange 6, that forms a seat 60 to receive a gasket or packing ring 7, and at this point it should be stated that the cover 5 is the width of the flange 6 larger than the elliptical opening in the top 2, such relative shapes of the cover and the opening 3 being so that when the cover is turned one quarter around from point X to point Y, the said cover will pass through the opening 3 in the top 2 if the cover 3 is inclined or slanted enough to allow one end thereof to pass under the top rim, see Fig. 3. After the cover is inserted under the top rim as stated it is turned back one quarter around to the point X and when thus positioned it snugly closes the opening 3 with its flange 6 directly under the under cut seat or groove 4 in the utensil top 2, as is best shown in Fig. 4, and when thus positioned the said cover is held by a holding means, the construction of which is best shown in Figs. 1, 2 and 5.

The cover holding means referred to, comprise toggle levers, that include a pair of oppositely disposed extensible members 8—8 having elongated slots 9—9 at the outer ends that ride on stud pins 10—10 secured to the cover 5, and a central lever member 11, that is horizontally rockable, on a tubular stem or handle 12 that projects up from the center of the cover, and the said member 11 includes an extension 11ª that carries a hand-knob 13. Toggle members 8—8 are pivotally connected as at 80—80, to the lever 11 and they are guided to move into alining positions when at their locked position by the studs 10, as stated, it being understood that when at their locked positions, as shown in full lines, Figs. 1 and 2, the outer ends of the members 8—8 project over the rim edge of the utensil top 2. The tubular handle or stem 12 has its lower open end in communication with the utensil or pot 1, and threaded as at 12ª to enter the threaded aperture 5ª in the cover 5. The bore of the stem 12 forms a steam vent and the upper end of the said stem terminates in a valve seat 14 which is normally engaged by a ball valve 15 carried on a rod 16, the short end of which is fulcrumed in a loop 17 formed in a coiled spring wire grip 18 that surrounds the stem 12 and by which the cover 5 is handled. 19 designates a weight slidably mounted on the rod 16. By reason of providing a vertically extended tubular stem 12 and mounting the relief valve thereon above the handle or grip portion thereof, as stated and shown, the grip 18 can be readily grasped for shifting the cover 5 to its different positions without danger of scalding the hand. By forming the rim edge of the opening 3 and the rim of the cover with flanged seats, as described, after the cover is properly adjusted to its closure position, steam pressure within the pot or utensil will tend to force the cover 5 upwardly to cause the flange 6 thereof as it compresses the gasket to enter the annular seat 4 at the rim edge of the opening 3, as is clearly shown in Fig. 4, by reference to which it will be seen that the gasket is thereby securely held within the pocket formed by the opposing flanges on the cover and the top, and out of direct contact with the hot vapors, thereby avoiding spreading out and a rapid disintegration of the gasket, such as usually occurs when the gasket is exposed to the hot vapors.

From the foregoing taken in connection with the drawing it is apparent that I have provided a high pressure cooking utensil of a very simple and inexpensive nature and in which the cover construction is such that the said cover can be quickly positioned for being mounted on the utensil top or removed therefrom and held to or released from the closure position by the simple operation of swinging the toggle lever 11. It is understood that the relief valve, in practice, is adjusted to relieve excess pressure within the utensil.

What I claim is:

1. In combination with the utensil having an elliptical opening, and an elliptical cover adapted to be inserted through said opening, said cover and said utensil having opposing flanges, a packing between said flanges, said flanges being adapted for seating under pressure within the utensil; of a stem mounted on the cover, a hand grip on the stem, cover holding latch bars mounted on the cover to engage the top of the utensil, said stem having a steam escape passage through the same terminating in a valve seat at the top, and a safety valve engaging said seat, substantially as shown and for the purposes described.

2. In combination with the utensil and the cover, said utensil having an opening into which the cover is adapted to be inserted, said cover and said utensil having opposing sealing flanges; of a tubular stem mounted on the cover and adapted to form a handle by which the cover may be manipulated, cover sustaining latch bars carried on the cover and adapted to be projected over the utensil, said latch bars including toggle elements having provision for engagement by the operator while holding the stem of the cover, substantially as shown and described.

3. In combination with the utensil and the cover, said utensil having an opening into which the cover is adapted to be inserted, said cover and said utensil having opposing sealing flanges, of a tubular stem mounted on the cover and adapted to form a handle, by which the cover may be manipulated, cover sustaining latch bars carried on the cover and adapted to be projected over the utensil, said latch bars including toggle elements having provision for engagement by the operator while holding the stem of the cover, said stem having a steam escape passage through the stem opening to atmosphere above the position on the stem at which the operator's hand is adapted to grasp the stem whereby the escaping steam will occur above the operator's hand, and an escape valve for controlling the outlet end of said stem.

4. In a high pressure cooker; the combination with the body having a cover opening, and a cover adapted to seat in said opening by pressure from within; of a stem projecting from said cover and having a steam escape passage through the same, said passage terminating in a valve seat at the upper end of the stem, a spiral wire handle sustained around the stem by which the operator is adapted to grip the stem to manipulate the cover, said wire handle having a loop, a valve rod fulcrumed in said loop and having a valve element to engage said seat and a weight to hold said element seated against the steam pressure, all being arranged whereby the blow-off steam will escape above the hand-hold.

5. In a high pressure cooker, the combination with a body having a cover opening, and a cover adapted to seat in said opening by pressure from within; of a stem projecting from said cover and having a steam escape passage through the same, said passage terminating in a valve seat at the upper end of the stem, a spiral wire handle sustained around the stem by which the operator is adapted to grip the stem to manipulate the cover, said wire handle having a loop, a valve rod fulcrumed in said loop and having a valve element to engage said seat and a weight to hold said element seated against the steam pressure, all being arranged whereby the blow-off steam will escape above the hand-hold, and cover supporting toggle levers mounted on the cover and stem and designed to be operated by one hand while the operator grasps the hand-hold of the stem by the other hand.

6. In a cooking utensil, the combination of a body having a top rim, a cover for the body adapted for being held up to the closure position against the top rim by the steam pressure within the body, a stem vertically projected from the cover that forms a hand-hold, toggle lever devices mounted on the cover for sustaining it from the top rim of the body, said devices including a pair of oppositely disposed slotted members adapted for being extended over the top rim of the body, studs on the cover for engaging the slots in the said members and a connecting link or member fulcrumed on the aforesaid stem and pivotally joined with the inner ends of the extensible members whereby as the said link member is swung in opposite directions, the slotted members are moved to or from their locking positions.

7. In a high pressure cooking utensil, the combination of a body that includes a flat top having an elliptical opening and an under cut seat that extends entirely around the rim edge of the said opening, an elliptical cover adapted to be inserted through the said opening in the body, the said cover including a drop rim flange, a stem projected centrally from the cover that forms a handle for manipulating said cover, a gasket mounted on the rim flange of the cover, said rim flange and the seat in the rim of the body adapted to be relatively so positioned when the cover is adjusted to its closure position whereby the pressure within the body will tend to force the rim flange of the cover up into the under cut seat on the body top to thereby compress the gasket entirely within the said under cut seat and keep it from contacting with the vapors within the body, and means mounted on the cover which include toggle lever devices for sustaining the cover in position under the top rim of the body.

8. In a high pressure cooker, the combination with the body, of a cover therefor, a tubular handle attached to and projected centrally up from the cover, said tubular handle opening through the cover whereby to form a vent for the body, a bearing member on the handle at one side of the opening and a relief valve, a valve rod on which said valve is mounted, said rod being mounted in the handle bearing at a place above the grip portion thereof, said valve rod extending over the handle and terminating in a counterbalanced weight.

THOMAS J. NASH.